Feb. 11, 1930.     H. A. ROSENTHAL     1,746,869

METHOD OF MAKING NESTABLE RECEPTACLES

Filed April 1, 1929

INVENTOR
Harry A. Rosenthal
BY
Booth & Booth
ATTORNEYS.

Patented Feb. 11, 1930

1,746,869

UNITED STATES PATENT OFFICE

HARRY A. ROSENTHAL, OF OAKLAND, CALIFORNIA

METHOD OF MAKING NESTABLE RECEPTACLES

Application filed April 1, 1929. Serial No. 351,644.

My invention relates to the manufacture of sheet metal receptacles suitable for use as flower pots.

The principal object of the invention is to provide a method of forming such receptacles from cylindrical tin-plate cans such as those used for the preservation of fruit. It is customary in the canning art to preserve temporarily certain perishable food products in large cans, holding about one gallon, during the harvest season, and then to transfer such products to various sizes of smaller cans, for the retail trade, in the off season. As a result of this practise, there is considerable waste of the large cans, which, after being emptied, have heretofore been suitable only for scrap metal. It is my purpose, by means of the present invention, to utilize such used and heretofore wasted cans by converting them into ornamental receptacles suitable for flower pots.

Because of the low cost of such waste cans, and the cheapness with which my process can be carried out, it is possible to sell my flower pots at a very low price, thereby making them available to gardeners and florists to a greater extent than is possible with the ordinary flower pots.

My metal flower pots, because of their low cost and the lightness of their material, can frequently be set in the ground without removing the plant, thus avoiding any disturbance of the roots. The metal rusts out and disappears before the roots outgrow the pot. On the other hand, the pots are sufficiently ornamental in shape, and can be painted or lacquered at such small additional cost, that they may be used to keep house or potted plants in for a considerable time.

Another object of the invention is to make the receptacles in nestable form, so that they can be shipped and stored in relatively small spaces, thus further reducing their cost. This is accomplished by crimping the lower end of the initially cylindrical can and at the same time deforming its bottom, so that the finished product has the general shape of the ordinary flower pot, tapering outwardly toward its top. Such tapering facilitates the removal of the plant, if such be desired, without breaking up the earth surrounding its roots.

In the accompanying specification and drawing, I have described and illustrated a preferred form of receptacle or flower pot and one form of apparatus for carrying out my method for the manufacture thereof. It is to be understood, however, that changes, within the scope of the claims hereto appended, may be made in both the product and the process, and that any suitable apparatus may be employed for carrying out the latter, without departing from the spirit of the invention.

In the drawings, Figure 1 is a vertical section of an apparatus for forming my receptacles from cylindrical cans.

Figure 3:
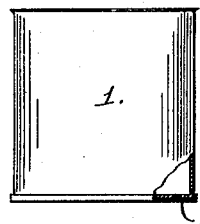
Fig. 3 is a side elevation of the can from which my receptacle is made.

Referring more particularly to the drawings, I show in Fig. 3 a cylindrical can, from which one end has been removed. The reference numeral 1 designates the body and 2 the bottom of said can, said bottom being flat or substantially so. By the process to be described later, I crimp or flute the body 1, the flutes 3, Fig. 4, extending from the bottom nearly to the top, and decreasing in width and depth toward the top. As a result, the diameter of the lower portion of the body is decreased, and its sides are tapered inwardly toward the bottom. At the same time, the bottom 2 is pressed upwardly in its central region, as shown at 4 in Fig. 5, so that its periphery is decreased to correspond to the lower end of the body 1. A central hole 5 may be punched in said bottom, to provide drainage if the receptacle is to be used as a flower pot.

Figure 4:
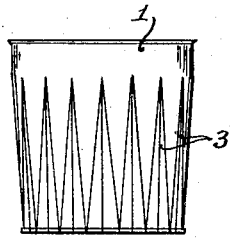
Fig. 4 is a side elevation of my receptacle.
Figure 5:
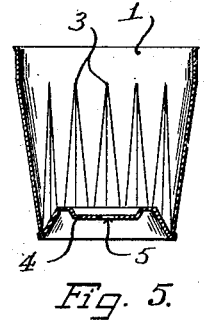
Fig. 5 is a vertical section thereof.

The cylindrical can shown in Fig. 3 thus becomes a tapered nestable receptacle, as shown in Figs. 4 and 5, whose flutes 3 not only take up the extra metal, but add to the appearance of the article.

Figure 1:
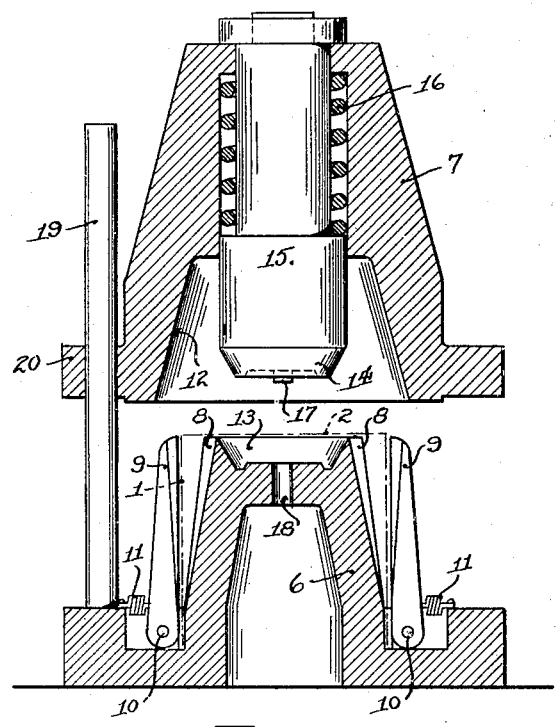
Figure 2:
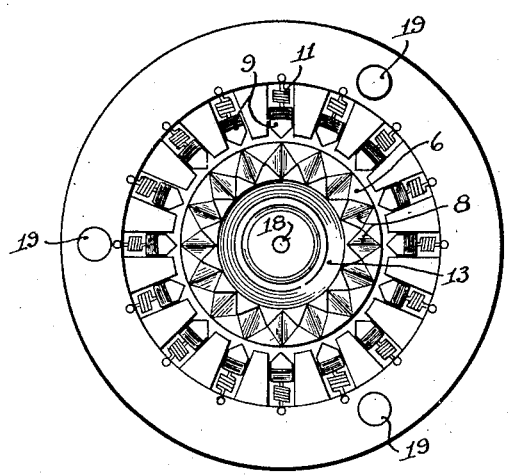
Fig. 2 is a plan of the lower die member of Fig. 1.

I shall now describe an apparatus for carrying out the above method of forming a nestable receptacle from a cylindrical can, with reference to Figs. 1 and 2.

Two dies, 6 and 7, are shown in Fig. 1, and are understood to be mounted in any suitable apparatus, not shown, for moving them toward and away from each other. The lower die 6 is of frusto conical form, and its peripheral surface is fluted, as shown at 8, the flutes extending from the top nearly to the bottom, and being deeper and wider at the top. A series of swinging crimping fingers 9 are pivotally mounted at 10 in the base of the die 6. They are positioned opposite the flutes 8, and their inner faces correspond to said flutes in shape and are adapted to seat within them when swung inwardly. Springs 11 hold the fingers normally upright.

The cylindrical can is placed with its body 1 fitting over the die 6 and its bottom 2 uppermost, as indicated in broken lines in Fig. 1. The upper die 7 has an interior conical surface 12 adapted to engage the outer surfaces of the fingers 9, and to force them inwardly, pressing the metal of the can body 1 into the flutes 8 of the lower die, thereby forming the flutes 3 in said body.

The lower die 6 has a depressed upper end 13, which corresponds with a face 14 carried by the upper die 7 to deform and press inwardly, or downwardly as shown in Fig. 1, the can bottom 2. The die face 14 is formed upon a plunger 15 slidably mounted centrally in the upper die 6, and backed by a heavy spring 16. The die faces 13 and 14 may be suitably formed to give any desired shape to the can bottom 2, it being essential only that the central portion of said bottom be forced inwardly, or dished, as shown at 4 in Fig. 5. A suitable punch 17 and corresponding hole 18 may be formed in the die faces 14 and 13, to punch the central hole 5 in the bottom of the receptacle.

Suitable posts 19 and guides 20 are provided to insure correct alignment of the dies. The can being placed in inverted position over the lower die 6, upon the approach of the two dies, the fingers 9 are forced inwardly and at the same time the die face 14 presses the central portion of the can bottom 2 into the depression 13 of the lower die, so that the diameter of the lower end of the can (its upper end as seen in Fig. 1) is reduced, as the flutes 3 are formed in its sides, without breaking its bottom 2 or the seam between said bottom and the body 1. Toward the end of the operation, the central hole 5 is formed by the punch 17 entering the hole 18. The spring 16 allows the die plunger 15 to recede upwardly enough to permit the fingers 9 to be fully seated by the conical surface 12.

Thus the receptacle shown in Figs. 4 and 5 is fully formed from the cylindrical can of Fig. 3 in a single operation, the cylindrical body being deformed by fluting into a tapered body, and the substantially flat bottom being deformed and reduced in circumference by pressing its central portion inwardly. The result is a nestable and ornamental receptacle suitable for use as a flower pot.

I claim:—

1. The method of forming a nestable receptacle from a can having a cylindrical body and one closed end, which consists in crimping said body into tapered form and simultaneously deforming said end to reduce its circumference.

2. The method of forming a nestable receptacle from a can having a cylindrical body and a closed bottom, which consists in tapering the lower portion of said body inwardly by forming longitudinal flutes therein, and simultaneously deforming said bottom to reduce its circumference.

3. The method of forming a nestable receptacle from a can having a cylindrical body and a closed bottom, which consists in tapering the lower portion of said body inwardly by forming longitudinal flutes therein, and simultaneously pressing the central region of said bottom inwardly to reduce its circumference.

4. The method of forming a nestable receptacle from a can having a cylindrical body and one closed end, which consists in deforming said body by tapering its lower portion inwardly, and simultaneously deforming said end to reduce its circumference.

5. The method of forming a flower pot from a can having a cylindrical body and one closed end, which consists in deforming said body by tapering its lower portion inwardly, and perforating said end and deforming it to reduce its circumference.

6. The method of forming a nestable receptacle from a can having a cylindrical body and one closed end, which consists in forming longitudinal flutes in said body by radial pressure and deforming said end by endwise pressure to reduce its circumference.

In testimony whereof I have signed my name to this specification.

HARRY A. ROSENTHAL.